Feb. 25, 1958 H. P. TROENDLY ET AL 2,824,635
ONE-WAY ENGAGING DEVICE
Filed Dec. 24, 1951 3 Sheets-Sheet 1
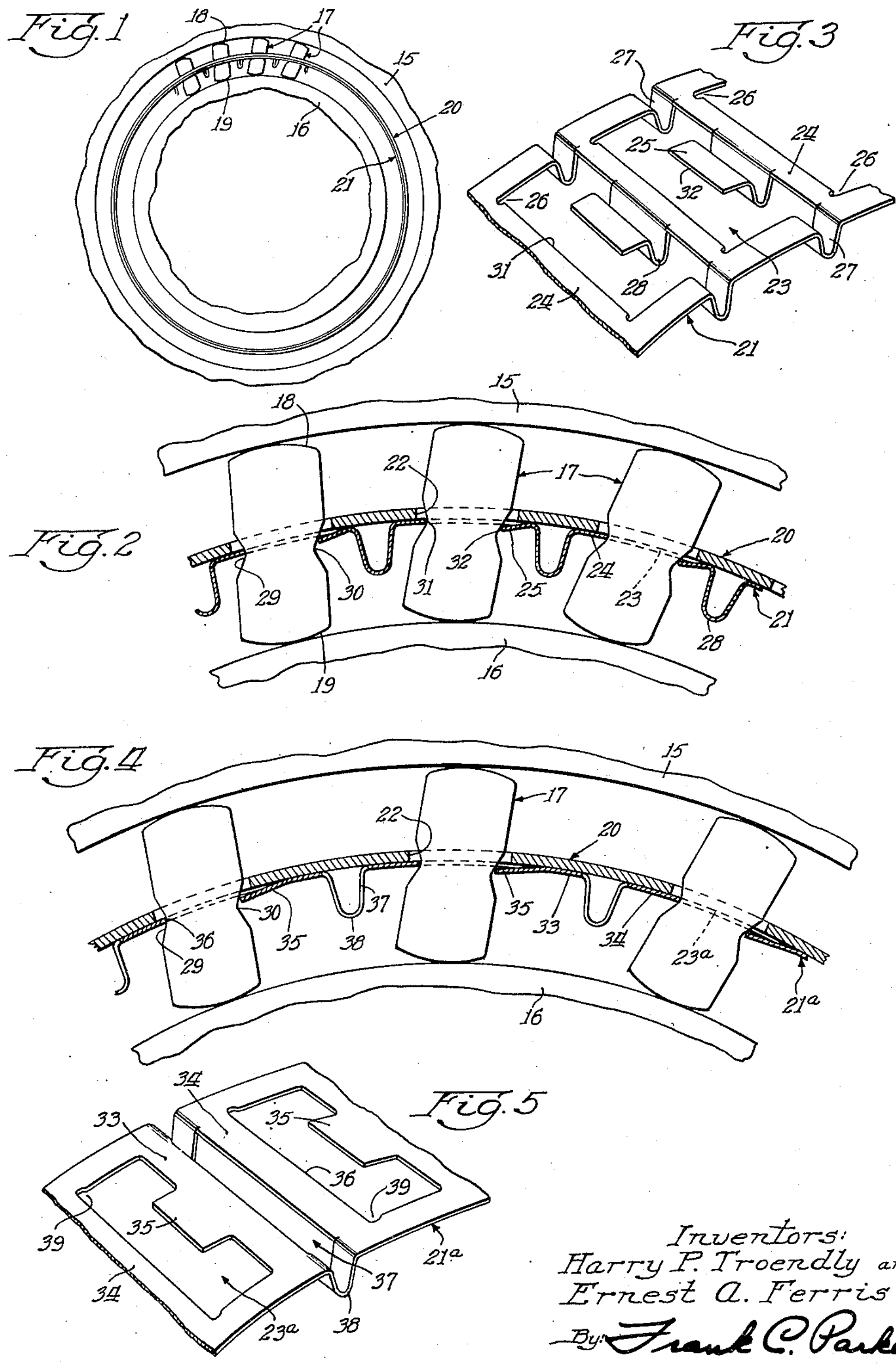
Inventors:
Harry P. Troendly and
Ernest A. Ferris
By: Frank C. Parker
Atty.

Feb. 25, 1958 H. P. TROENDLY ET AL 2,824,635
ONE-WAY ENGAGING DEVICE
Filed Dec. 24, 1951 3 Sheets-Sheet 2
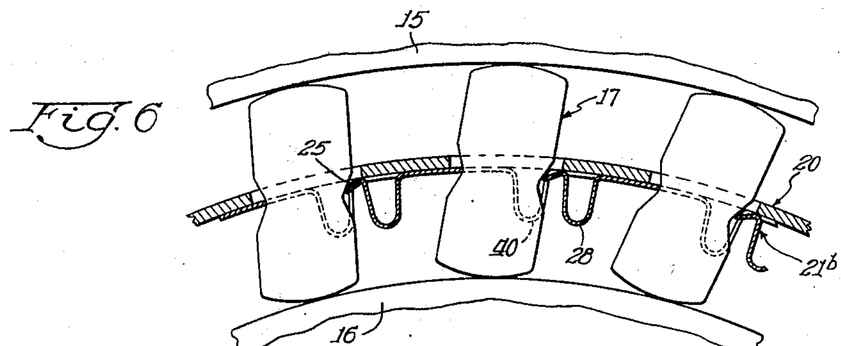
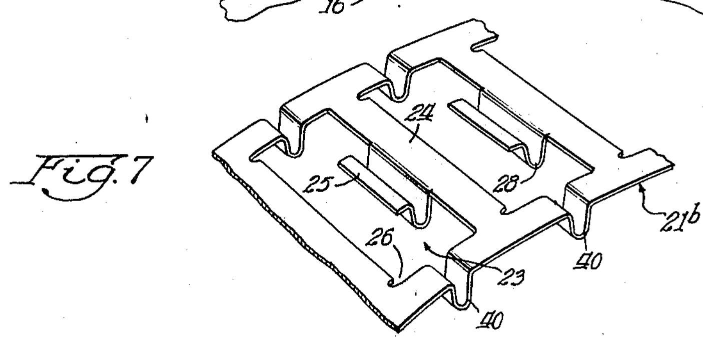
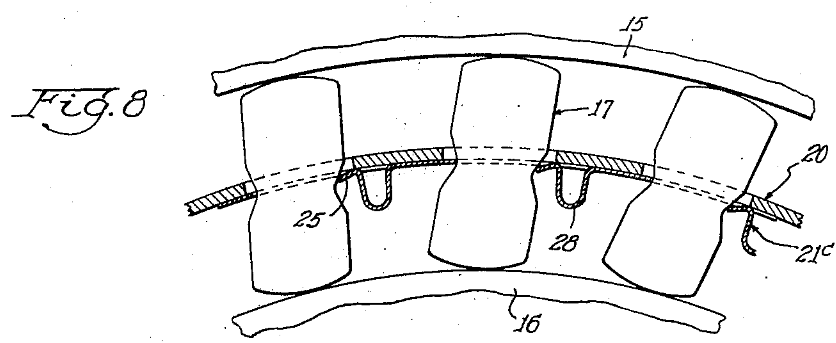
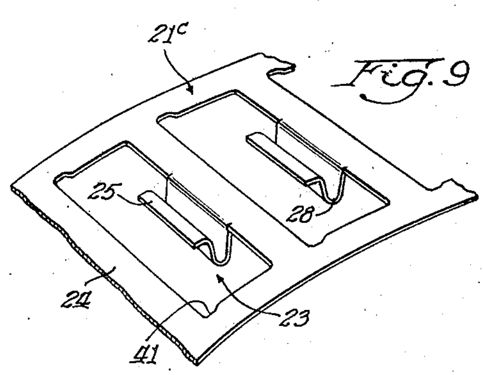
Inventors:
Harry P. Troendly and
Ernest A. Ferris
By: Frank C. Parker
Atty.

ONE-WAY ENGAGING DEVICE
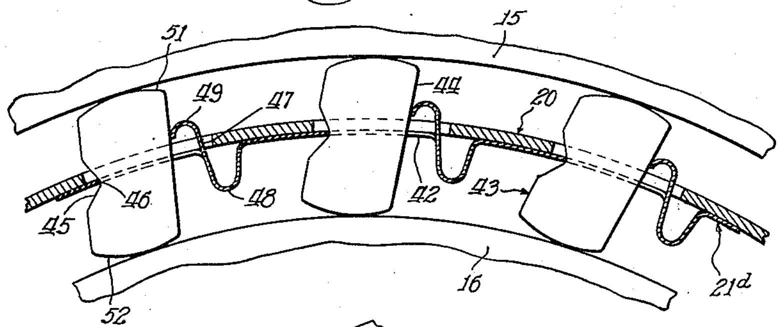
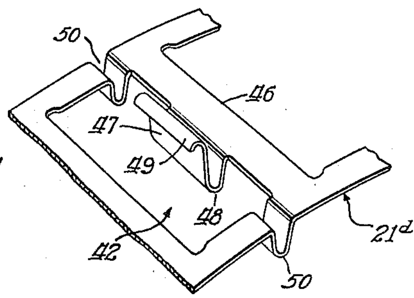
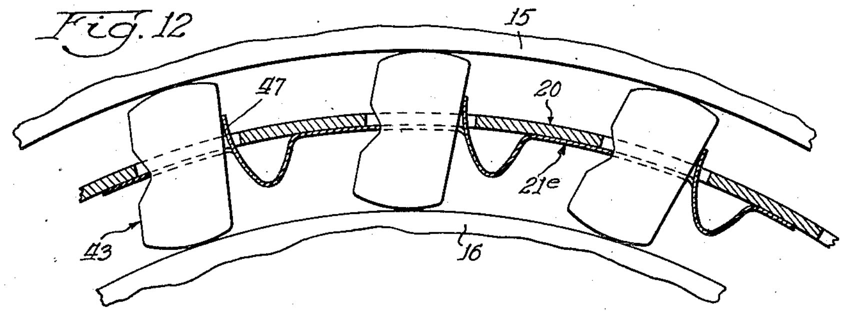
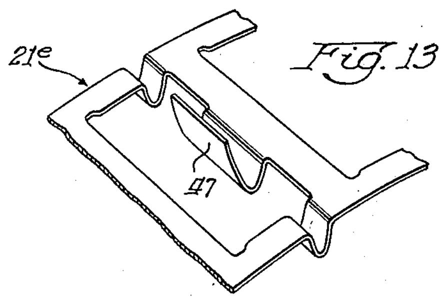
Inventors:
Harry P. Troendly and
Ernest A. Ferris
By: Frank C. Parker
Atty.

United States Patent Office 2,824,635

Patented Feb. 25, 1958

2,824,635

ONE-WAY ENGAGING DEVICE

Harry P. Troendly, La Grange Park, and Ernest A. Ferris, Oak Park, Ill., assignors to Borg-Warner Corporation, Chicago, Ill., a corporation of Illinois Application December 24, 1951, Serial No. 263,064

20 Claims. (Cl. 192—45.1)

The present invention relates generally to one-way engaging devices and more particularly to one-way engaging devices of the type employing tiltable sprags or grippers disposed between a pair of substantially concentric races and having a resilient sprag retainer for spacing the sprags between the races and tilting the sprags into wedging engagement with the races.

The present invention comprises an improvement in one-way engaging devices of the general type disclosed in the copending application of E. A. Ferris, Serial No. 202,385, filed December 22, 1950, now U. S. Patent No. 2,750,019.

The primary object of the present invention is to provide, in a one-way engaging device of the aforementioned general type, improved means for holding the sprags in a peripherally spaced relation between the races, resiliently urging the sprags into wedging engagement with the races and providing a peripheral yield between each adjacent pair of sprags so that any one of them may be displaced slightly peripherally relative to the others without permanently distorting the holding means.

More particularly, the present invention has for an object to provide a sprag positioning and energizing cage comprising a substantially annular ring of resilient sheet metal formed with a series of openings therein for receiving and peripherally spacing the sprags and having a series of integral tabs respectively extending into each of the openings into engagement with the respective sprags for continuously energizing the sprags toward wedging engagement with the races. The means providing the peripheral yield between each of the sprags in all of the embodiments disclosed herein comprises a transverse wrinkle formed in the annular ring which wrinkle provides sufficient added resilience to permit any one of the sprags to be displaced slightly peripherally relative to the others without greatly disturbing the others and without permanently distorting the positioning and energizing ring. In some of the embodiments of the invention the transverse wrinkles are formed in the energizing tabs, while in another embodiment of the invention additional openings are provided in the annular cage alternately spaced between the sprag receiving openings, with the transverse wrinkles intersecting the additional openings. The transverse wrinkles intersecting the additional openings accomplish substantially the same purpose as the transveres wrinkles formed in the energizing tabs.

Another object of the invention is to provide tiltable sprags for a one-way engaging device wherein the sprags are formed with one flat side connecting its two engaging surfaces and with a transversely extending notch in the other transverse side connecting the engaging surfaces. With this construction one side of the sprag receiving openings in the resilient cage is seated within the single notch of each sprag and the energizing tabs continuously engage the opposite flat side of the sprags.

In one-way engaging devices constructed in accordance with the principles set forth herein any one of the sprags can be out-of-phase or disengaged from the races while the others are engaged therewith and the peripheral yield afforded by the transverse wrinkles in the sheet metal positioning and energizing cage enables the out-of-phase sprag to move relative to the remaining sprags without damage to the energizing tab or to the cross pieces of the cage between the successive openings. It has been found that this advantage of the present invention affords a distinct improvement over one-way engaging devices of the type disclosed in the aforementioned copending Ferris application.

In one-way engaging devices of the type disclosed herein it has been found, particularly when the sprags initially move into wedging engagement with the races that very often some one or more of them will initially tend to engage both races but, momentarily thereafter, due to vibration principally, they pop out of engagement with the races or tend to become disengaged from the races and when this occurs these sprags move peripherally, relative to the remaining sprags and the positioning cage, at a very high rate of speed. The peripheral yield afforded by the transverse wrinkles in the resilient cage functions when some of the sprags pop out of engagement with the races, as mentioned above, to prevent damage to the energizing tabs or to the cross pieces of the cage between the sprags.

When one-way engaging devices of the type disclosed herein are used to transmit heavy torque loads it has been found advantageous to utilize a relatively rigid cage mounted concentrically with respect to the resilient cage and having sufficiently large openings therein to allow angular movement of each of the sprags relative thereto. In these constructions, when the sprags initially become partially engaged with both races and thereafter pop out of engagement therewith, the resilient cage yields peripherally between the sprags sufficiently to allow them to strike the rigid cage so that it takes the shock. Once the peripheral movement of the sprags which pop out of engagement with the races has been stopped, the energizing tabs associated with such sprags are then immediately effective to again reengage these sprags. Inasmuch as this tendency of some of the sprags to pop out of engagement with the races is present in practically all one-way engaging devices of the present type and since it is accentuated by torsional vibration of the shafts to which the races are secured, as well as by vibrations in all directions of the engaging device as a whole, the present invention, by providing means to prevent any damage to the structure due to such action, comprises a distinct improvement in the art.

The foregoing objects and advantages and numerous others will become apparent from the following detailed description of the invention when read in conjunction with the accompanying drawings wherein:

Fig. 1 is a side elevational view of a one-way engaging device constructed in accordance with the principles of the present invention;

Fig. 2 is a detailed fragmental sectional view of one form of the engaging device;

Fig. 3 is a fragmentary perspective view of the resilient cage employed in the structure disclosed in Fig. 2;

Fig. 4 is a detailed fragmental sectional view of a modified form of the invention;

Fig. 5 is a fragmentary view of the resilent cage used in the Fig. 4 embodiment;

Fig. 6 is a fragmentary sectional view of a second modified form of the invention;

Fig. 7 is a fragmentary perspective view of the resilient cage shown in Fig. 6;

Fig. 8 is a fragmental sectional view of another modified form of the invention;

Fig. 9 is a fragmentary perspective view of the resilient cage used in Fig. 8;

Figs. 10 and 12 are fragmental sectional views of two other embodiments of the invention; and Figs. 11 and 13 are fragmentary perspective views of the resilient cages used in Figs. 10 and 12 respectively.

Referring to the drawings, wherein like reference numerals in the different views identify identical parts, and referring first to Fig. 1, the one-way engaging device comprising the subject matter of the present invention includes an outer race 15 and an inner race 16, both of which are substantially cylindrical and concentrically mounted and each of which is adapted to be respectively connected with an associated rotatable shaft (not shown). A plurality of tiltable grippers or sprags 17 are disposed between the races 15 and 16 and each is provided with a pair of eccentric wedging surfaces 18 and 19 for respectively wedgingly engaging the outer race 15 and the inner race 16 upon counterclockwise tilting of the sprags 17.

Means are provided for spacing the sprags 17 peripherally between the races 15 and 16 and this means may comprise a pair of annular cages 20 and 21 which are concentrically disposed substantially medially between the races 15 and 16. The annular cage 20 is a relatively rigid member formed with a plurality of peripherally disposed openings 22 which are peripherally wider than the sprags 17 in order to afford a limited amount of tilting movement of the sprags 17. In applications where relatively light torque loads are transmitted by the sprags 17 the cage 20 may be dispensed with, if desired. The cage 21 consists of an annular ring of resilinet sheet metal and it too is formed with a plurality of peripherally spaced openings, designated generally by reference numeral 23.

Referring particularly to the embodiment of the invention disclosed in Figs. 2 and 3, the portions of the sheet metal ring 21 between successive openings 23 comprise cross pieces 24. The cross pieces 24 have sprag energizing tabs 25 extending from one side thereof and integral therewith and these tabs extend respectively into the openings 23. At each end of the opposite side of the cross pieces 24 a fillet 26 is provided. A transverse wrinkle is provided in the cage 21 for each of the openings 23 and intersects each end of these openings at 27. The tabs 25 are also provided with a transverse wrinkle 28.

Each of the sprags 17 is provided with a pair of transversely extending notches 29 and 30, formed substantially medially between the two eccentric wedging surfaces 18 and 19. The sprags are positioned in the openings 23, as best shown in Fig. 2, with an edge 31 of each cross piece 24 being seated within the notch 29 and with an edge 32 on each of the tabs 25 being respectively seated within the notch 30 in each of the sprags. When the sprags 17 are positioned in the openings 23 in this manner, they each tilt or pivot about the edge 31 of the cross pieces 24 and the tabs 25, comprising an integral part of the cage 21, continuously exert a biasing force on the sprags urging them in a counterclockwise direction about the edges 31 as tilting axes. As is apparent, the biasing force, continuously exerted by the tabs 25, is effective at all times to tend to maintain the eccentric surfaces 18 and 19 in wedging engagement with the races 15 and 16 respectively.

When the sprags 17 are assembled in the openings 23 of the annular sheet metal cage 21 the transverse wrinkles 27 in the sides of the openings 23 and the transverse wrinkles 28 formed in each of the tabs 25 provide a peripheral yield between each adjacent pair of sprags 17.

In the operation of the engaging device, shown in Figs. 2 and 3, the race 15 may rotate freely clockwise relative to the race 16, any engagement between the surfaces 18 and 19 and the races 15 and 16 tending to tilt the sprags 17 clockwise, against the biasing force exerted by the tabs 25, into a disengaged position. Whenever the race 15 starts to rotate counterclockwise relative to the race 16 the biasing force exerted by the tabs 25, tending continuously to move the sprags 17 to bring the eccentric surfaces 18 and 19 into wedging engagement with the races 15 and 16, respectively, is effective momentarily thereafter to rotate the sprags counterclockwise to effect wedging engagement between the sprags and both races. When the race 15 begins rotating counterclockwise relative to the race 16, the tabs 25 energize each of the sprags 17, but due to vibration of the engaging device as a whole or due to torsional vibration, particularly of the shaft being picked up, one or more of the sprags 17 may start to engage both races but before complete wedging engagement is effected, it may pop out of engagement with the races 15 and 16 with a very violent action. When these sprags pop out of engagement with the races they tend to be displaced very rapidly peripherally until they strike the edges of the openings 22 in the rigid cage 20, the wrinkles 28 in the tabs 25 being violently compressed at this time. Due to the rigidity of the cage 20 it stops the peripheral movement of the sprags which have popped out of engagement with the races and immediately thereafter the wrinkles 28 in the tabs 25 expand to enable the tabs 25 to again exert an energizing bias against the sprags which momentarily popped out of engagement with the races so these sprags will again reengage the races. If the sprags which pop out of engagement with the races move too violently to be stopped by the cage 20 or to be stopped before completely compressing the associated tab 25, the transverse wrinkles 27 permit the resilient cage 21 between the cross pieces 24 to yield to thereby prevent damage to the mechanism.

It is understood that in applications where the torque load is not particularly great, it will not be necessary to utilize the rigid cage 20 as the strength of the cross pieces 24, in such applications, is sufficient to take the shock of any sprag 17 which pops out of engagement with the races 15 and 16. It will be noted that with the present construction the compressibility afforded by the wrinkles 28 in the tabs 25 and the wrinkles 27 in the sides of the openings 23 permits any one of the sprags 17 to be displaced peripherally without substantial disturbance of the remaining sprags 17. This is an important advantage not heretofore solved by prior constructions wherein the popping out of engagement of one or more of the sprags caused a shock to be imparted to the sprag positioning cage which, in turn, disturbed the engagement of all of the other sprags in the assembly. The wrinkles 28 in the tabs 25 also exert some force tending to prevent any sprag from popping out of engagement and this feature, in applications where the rigid cage 20 is not utilized, and the rigid cage 20, in applications where high torque loads are being handled, are effective to substantially eliminate any possibility of damage to the cross pieces 24 caused by shock due to the rapid peripheral movement of a sprag relative to the cage 21.

Turning now to the embodiment of the invention disclosed in Figs. 4 and 5, the races 15 and 16 are concentrically mounted and have a plurality of sprags 17 peripherally disposed between them. In this embodiment of the invention the rigid cage 20, which, as in all forms of the invention, may be dispensed with when low torque loads are to be transmitted, and a flexible cage **21*a* are concentrically positioned substantially medially between the races 15 and 16 and are respectively provided with openings 22 and 23*a* for peripherally spacing the sprags 17 between the races 15 and 16. The rigid cage 20 of the Fig. 4 embodiment of the invention is substantially identical with the rigid cage 20 of the Fig. 2 embodiment of the invention, the openings 22 in both cases being slightly wider peripherally than the peripheral width of the sprag 17** and this enables the sprags 17 to shift slightly peripherally with respect to the rigid cage 20.

The resilient cage **21*a* differs considerably, however, from the resilient cage 21. The openings 23*a* are defined on opposite sides thereof by cross pieces 33 and 34, an integral tab 35 extending inwardly into each opening from the cross piece 33 for seatingly engaging in the notch 30 of each of the sprags 17. An edge 36 of the cross piece 34 is designed to seat within the notch 29 in each of the sprags 17**.

A plurality of openings 37 are disposed alternately with the openings **23*a* between the cross pieces 33 and 34. The resilient sheet metal ring 21*a* is transversely wrinkled at 38 which wrinkles intersect each of the openings 37 and provide a peripheral yield between each of the sprags 17 disposed in the openings 23*a*. A pair of fillets 39 at opposite ends of the edge 36 of each cross piece 34 are provided for facilitating tilting of the sprags 17 in the openings 23*a***.

In the operation of the embodiment of the invention disclosed in Figs. 4 and 5 the tabs 35 continuously tend to tilt the sprags 17 counterclockwise about the edge 36 of the cross pieces 34 into wedging engagement with both races 15 and 16. The wrinkles 38 perform the function of providing a peripheral yield between each of the sprags 17 when they are disposed in the resilient cage **21*a*. In this connection, when one of the sprags tends to pop out of engagement with the races 15 and 16, which phenomenon, as stated heretofore, occurs principally during the initial engagement of the sprags with the races and which is due to vibration primarily, the sprag 17 which pops out of engagement may easily carry with it its associated tab 35 and cross piece 33 while the wrinkles 38 compress slightly to enable the sprag to strike the edge of the openings 22 in the rigid retaining member 20. The shock of the sprags 17 which have popped out of engagement with the races is taken by the rigid cage 20 or, in the case where the rigid cage 20 is not being utilized, the shock is taken up by the resiliency of the wrinkles 38. Thereafter, the wrinkles 38 expand and the tabs 35 are immediately again effective to energize the sprags 17 to tend to cause them to reengage the races 15 and 16**.

The embodiment of the invention disclosed in Figs. 6 and 7 is substantially like that disclosed in Figs. 2 and 3 and in this embodiment the plurality of sprags 17 are maintained in peripherally spaced position by means of the rigid cage 20 and a resilient cage **21*b* disposed between the concentric races 15 and 16. The cage 21*b* is provided with peripherally disposed openings 23 defined by the cross pieces 24 and having energizing tabs 25 extending into the openings. At each end of the cross pieces 24 the fillets 26 are provided for facilitating tilting of the sprags 17 and each of the tabs is provided with the transverse wrinkle 28 for providing a peripheral yield between each of the sprags 17 when disposed in the openings 23. The resilient member 21*b*, instead of being provided with transverse wrinkles 27 aligned with the transverse wrinkle 28 in the tabs 25, is provided with transverse wrinkles 40 intersecting the openings 23 but displaced somewhat from alignment with the wrinkles 28** and located substantially medially of the openings.

The operation of the embodiment of the invention disclosed in Figs. 6 and 7 is substantially identical with that of the embodiment disclosed in Figs. 2 and 3 and accordingly further description thereof is not deemed necessary.

In the embodiment of the invention disclosed in Figs. 8 and 9 the sprags 17 are peripherally spaced by the rigid cage 20 and a resilient cage **21*c* disposed substantially medially between the concentric races 15 and 16. This embodiment of the invention is very nearly like that disclosed in Figs. 2 and 3, however, no transverse wrinkles are provided in the resilient cage 21*c*. The cage 21*c* is provided with openings 23 defined by the cross pieces 24, the openings 23 having energizing tabs 25 extending thereinto and integrally formed with the resilient member 21*c*. The tabs 25 are each transversely wrinkled for providing a peripheral yield between each of the sprags 17 as indicated by wrinkles 28. A pair of fillets 41 at opposite ends of each of the cross pieces 24 and of the same configuration as the fillets 39 of Fig. 5, are provided for facilitating tilting of the sprags 17**.

The embodiment of the invention disclosed in Figs. 8 and 9 functions in substantially the same manner as that disclosed in Figs. 2 and 3. Since the embodiment of the invention disclosed in these Figs. 8 and 9 functions in substantially the same manner otherwise as the embodiment shown in Figs. 2 and 3, a detailed description of the operation thereof is not deemed necessary.

The embodiment of the invention disclosed in Figs. 10 and 11 utilizes the inner and outer races 15 and 16 and may or may not employ the rigid cage 20, as desired. A resilient cage **21*d*, being formed differently than any of resilient cages heretofore described, is provided with a series of openings 42 for receiving and peripherally spacing a plurality of sprags 43**.

The sprags 43 have a different configuration than the sprags 17 in that the notches 30 are not provided therein, the one side 44 of the sprags 43 being substantially flat. The sprags 43, however, are provided with transversely extending notches 45 and an edge 46 of each of the openings 42 seats within the notches 45 to provide tilting axes for the sprags 44. Extending into each of the openings 42 and integrally formed with the cross pieces 46 are energizing tabs 47 which engage the flat side 44 of each of the sprags 43 when they are assembled in the openings 42. In order to provide a peripheral yield between each of the sprags 43 each of the tabs 47 is provided with a pair of transversely extending wrinkles 48 and 49 and transversely extending wrinkles 50, intersecting the openings 42 and aligned with the wrinkles 48 in the tabs 47, are also provided.

In operation, the structure shown in Figs. 10 and 11 functions in substantially the same manner as that shown in Figs. 2 and 3, the tabs 47 exerting a continuous energizing force tending to urge the sprags 43 counterclockwise about their tilting axes to bring their eccentric surfaces 51 and 52 respectively into engagement with the races 15 and 16. Further description of the operation of this embodiment of the invention is not deemed necessary.

The embodiment of the invention disclosed in Figs. 12 and 13 is very similar to that shown in Figs. 10 and 11, employing a plurality of sprags 43 maintained in peripherally spaced relation between the races 15 and 16 by cages 20 and **21*e*. The cage 21*e* is substantially identical with the cage 21*d* shown in Figs. 10 and 11, differing therefrom only in that the tabs 47 are not provided with the transversely extending wrinkles 49**. Since these two embodiments of the invention are otherwise identical and function in substantially identical manners further description of this embodiment of the invention is not considered necessary.

From the foregoing description of the present invention it is apparent that there is herein provided a one-way engaging device construction overcoming certain disadvantages inherent in similar constructions. In particular, the means providing the peripheral yield or resilience between each of the sprags substantially eliminates the usual damage to the cage cross pieces due to one or more of the sprags being out-of-phase during the load condition. Further, the resilience between the sprags minimizes the damage to the cage structure due to vibration. In this connection the peripherally yieldable portion between each of the sprags contracts when one of the sprags pops out of engagement and immediately thereafter is in condition for again energizing the sprags to cause reengagement thereof with both races.

It is contemplated that numerous changes and modifications may be made in the present invention without departing from the spirit or scope thereof.

What is claimed is:

1. A cage and gripper structure for a one-way engaging device comprising a ring of resilient sheet metal having means defining a series of openings spaced around its periphery for receiving a plurality of tiltable grippers, said sheet metal ring including a series of integral tabs respectively extending into each of the openings for continuously biasing each of the grippers arcuately in the same direction, and means on each of said tabs defining a transverse wrinkle therein to thereby permit peripheral displacement of each of the grippers relative to the others without permanently distorting said ring.

2. A cage and gripper structure for a one-way engaging device comprising a ring of resilient sheet metal having means defining a series of openings spaced around its periphery for receiving a plurality of tiltable grippers, said sheet metal ring including a series of integral tabs respectively extending into each of the openings for continuously biasing each of the grippers arcuately in the same direction, means on each of said tabs defining a transverse wrinkle therein to thereby permit peripheral displacement of each of the grippers relative to the others without permanently distorting the ring, and means defining additional transverse wrinkles in said ring aligned with the transverse wrinkles in said tabs for enabling the ring to yield peripherally.

3. A cage and gripper structure for a one-way engaging device comprising an annular ring of resilient sheet metal having a series of openings spaced around its periphery for receiving a plurality of tiltable grippers, said sheet metal ring including an integral part corresponding to each of the openings for continuously biasing each of the grippers arcuately in the same direction, said sheet metal ring being formed with a second series of openings spaced around its periphery and disposed alternately with said first-named series of openings, said ring being formed with transverse wrinkles intersecting each of said second series of openings for permitting peripheral displacement of each of the grippers relative to the others without permanently distorting the ring.

4. A cage and gripper structure for a one-way engaging device comprising an annular ring of resilient sheet metal having a series of openings spaced around its periphery for receiving a plurality of tiltable grippers, said sheet metal ring including a series of integral tabs respectively extending into each of the openings for continuously biasing each of the grippers arcuately in the same direction, each of said tabs being transversely wrinkled for permitting peripheral displacement of each of the grippers relative to the others without permanently distorting the ring, and additional transverse wrinkles in said ring intersecting said openings and displaced peripherally from the transverse wrinkles in said tabs for enabling the ring to yield peripherally.

5. In a one-way engaging device, a pair of opposed substantially concentric races, a series of tiltable wedging elements disposed between the races, said wedging elements being tiltable in one direction into wedging engagement with both of said races and tiltable in the opposite direction to tend to disengage said elements from said races, a resilient sheet metal retaining member concentrically mounted between said races and having means defining a series of openings therein for receiving the wedging elements and holding them in peripherally spaced relation between said races and also having integral means in engagement with the elements continuously biasing the elements by spring force derived from the resilient member itself into wedging engagement with the races, and peripherally yieldable means defined by said resilient sheet metal retaining member comprising transverse wrinkles therein and disposed between each adjacent pair of said wedging elements for enabling each of the wedging elements to shift slightly peripherally relative to the remaining wedging elements.

6. In a one-way engaging device, a pair of opposed substantially concentric races, a series of tiltable wedging elements disposed between the races, said wedging elements being tiltable in one direction into wedging engagement with both of said races and tiltable in the opposite direction to tend to disengage said elements from said races, a resilient sheet metal retaining member concentrically mounted between said races and having means defining a series of openings therein for receiving the wedging elements and holding them in peripherally spaced relation between said races and also having integral means in engagement with the elements continuously biasing the elements by spring force derived from the resilient member itself into wedging engagement with the races, and transverse wrinkles formed in said resilient sheet metal retaining member and disposed between each adjacent pair of said wedging elements for providing a peripheral yield between each of the wedging elements so that they may be displaced slightly peripherally relative to the remaining wedging elements.

7. In a one-way engaging device, a pair of opposed substantially concentric races, a series of tiltable wedging elements disposed between the races, said wedging elements being tiltable in one direction into wedging engagement with both of said races and tiltable in the opposite direction to tend to disengage said elements from said races, a resilient sheet metal retaining member concentrically mounted between said races and having a series of openings therein for receiving the wedging elements and holding them in peripherally spaced relation between said races, said resilient member being formed with a series of tabs respectively extending into each of said openings for engaging and continuously biasing the elements by spring force derived from the tabs themselves into wedging engagement with the races, said resilient member defining a second series of openings disposed alternately with said first named openings around the periphery of said retaining member, and transverse wrinkles respectively intersecting each of said second named openings for enabling the resilient member to yield peripherally between each of the wedging elements so that each of them may shift slightly peripherally relative to the remaining wedging elements.

8. In a one-way engaging device, a pair of opposed substantially concentric races, a series of tiltable wedging elements disposed between the races, said wedging elements being tiltable in one direction into wedging engagement with both of said races and tiltable in the opposite direction to tend to disengage said elements from said races, a resilient sheet metal retaining member concentrically mounted between said races and having means defining a series of openings therein for receiving the wedging elements and holding them in peripherally spaced relation between said races, said resilient member being formed with a series of tabs respectively extending into each of said openings for engaging and continuously biasing the elements by spring force derived from the tabs themselves into wedging engagement with the races, and transverse wrinkles formed in each of said tabs for providing a peripheral yield between each adjacent pair of said wedging elements to thereby enable each of the wedging elements to shift slightly peripherally relative to the remaining wedging elements.

9. In a one-way engaging device, a pair of opposed substantially concentric races, a series of tiltable wedging elements disposed between the races, said wedging elements being tiltable in one direction into wedging engagement with both of said races and tiltable in the opposite direction to tend to disengage said elements from said races, a resilient sheet metal retaining member concentrically mounted between said races and having means defining a series of openings therein for receiving the wedging elements and holding them in peripherally spaced relation between said races, said resilient member being formed with a series of tabs respectively extending into each of said openings for engaging and continuously biasing the elements by spring force derived from the tabs themselves into wedging engagement with the races, transverse wrinkles formed in each of said tabs for providing a peripheral yield between each adjacent pair of said wedging elements to thereby enable each of the wedging elements to shift slightly peripherally relative to the remaining wedging elements, and additional transverse wrinkles formed in said resilient member and intersecting each of said openings for providing a longitudinal yield in the resilient member.

10. In a one-way engaging device, the combination of opposed concentric races, a plurality of tiltable sprags having opposed eccentric surfaces for wedgingly engaging said races upon tilting of the sprags, a pair of members concentrically disposed between said races and each having a plurality of openings for receiving and peripherally spacing the sprags between said races, one of said members being substantially rigid and the openings therein being larger than the sprags and thereby permitting a limited amount of peripheral movement of the sprags relative to the one member, the other of said members comprising an annular ring of resilient sheet metal formed with integral energizing portions extending from one side of and into each of the openings therein, said sprags being engaged on opposite sides by said energizing portions and by the opposite sides of the openings in said annular ring and said energizing portions being effective to continuously tilt the sprags toward wedging engagement with said races, and transverse wrinkle means defined by said annular ring and disposed between each adjacent pair of said sprags and providing a peripheral yield in the annular ring between each adjacent pair of sprags so that any one of the sprags may be displaced peripherally within the limits of the openings in the rigid member.

11. In a one-way engaging device, the combination of opposed concentric races, a plurality of tiltable sprags having opposed eccentric surfaces for wedgingly engaging said races upon tilting of the sprags, a pair of members concentrically disposed between said races and each having a plurality of openings for receiving and peripherally spacing the sprags between said races, one of said members being substantially rigid and the openings therein being larger than the sprags and thereby permitting a limited amount of peripheral movement of the sprags relative to the one member, the other of said members comprising an annular ring of resilient sheet metal formed with integral energizing portions extending from one side of and into each of the openings therein, said sprags being engaged on opposite sides by said energizing portions and by the oppoosite sides of the openings in said annular ring and said energizing portions being effective to continuously tilt the sprags toward wedging engagement with said races, each of said opposite sides of said openings in the annular ring having a fillet at each end thereof for facilitating tilting of the sprags, and transverse wrinkle means defined by said annular ring and disposed between each adjacent pair of said sprags and providing a peripheral yield in the annular ring between each adjacent pair of sprags so that any one of the sprags may be displaced peripherally within the limits of the openings in the rigid member.

12. In a one-way engaging device, the combination of opposed concentric races, a plurality of tiltable sprags for wedgingly engaging said races upon tilting of the sprags, a member concentrically disposed between said races and having a plurality of openings for receiving and peripherally spacing the sprags between said races, said member comprising an annular ring of resilient sheet metal formed with integral energizing tabs extending from one side of and into each of the openings therein, said sprags being engaged on opposite sides by said energizing tabs and by the opposite sides of the openings and said energizing tabs being effective to continuously tilt the sprags toward wedging engagement with said races, and transverse wrinkle means defined by said annular ring and disposed between each adjacent pair of said sprags and providing a peripheral yield in the annular ring between each adjacent pair of sprags.

13. In a one-way engaging device, the combination of opposed concentric races, a plurality of tiltable sprags having opposed wedging surfaces for wedgingly engaging said races upon tilting of the sprags, a member concentrically disposed between said races and having a plurality of openings for receiving and peripherally spacing the sprags between said races, said member comprising an annular ring of resilient sheet metal formed with integral energizing tabs extending from one side of and into each of the openings therein, said sprags being formed with notches on opposite sides thereof which extend transversely with respect to said annular ring and which are formed substantially medially between said wedging surfaces, said energizing tabs being seated in the notches in one side of the sprags and the opposite sides of the openings in said annular ring being seated in the notches in the other side of the sprags and said energizing tabs being effective to continuously tilt the sprags toward wedging engagement with said races about said opposite sides of the openings as tilting axes, and transversely extending wrinkles defined by said annular ring and disposed between each adjacent pair of said sprags for providing a peripheral yield in the annular ring between each adjacent pair of sprags so that any one of the sprags may be displaced peripherally without permanently distorting the annular ring of resilient sheet metal.

14. In a one-way engaging device, the combination of opposed concentric races, a plurality of tiltable sprags having opposed wedging surfaces for wedgingly engaging said races upon tilting of the sprags, a member concentrically disposed between said races and having a plurality of openings for receiving and peripherally spacing the sprags between said races, said member comprising an annular ring of resilient sheet metal formed with integral energizing tabs extending from one side of and into each of the openings therein, each of said sprags being formed with a notch on one side thereof extending transversely with respect to said annular ring and formed substantially medially between said wedging surfaces, the opposite side of each of said sprags being substantially flat, said energizing tabs engaging the flat sides of said sprags and the opposite sides of the openings in said annular ring being seated in the notches in said sprags and said energizing tabs being effective to continuously tilt the sprags toward wedging engagement with said races about said opposite sides of the openings as tilting axes, and transverse wrinkles in each of said energizing tabs for providing a peripheral yield between each adjacent pair of sprags so that any one of the sprags may be displaced peripherally relative to the remainder of the sprags.

15. In a one-way engaging device, the combination of opposed concentric races, a plurality of tiltable sprags having opposed wedging surfaces for wedgingly engaging said races upon tilting of the sprags, a member concentrically disposed between said races and having means defining a plurality of openings for receiving and peripherally spacing the sprags between said races, said member comprising an annular ring of resilient sheet metal formed with integral energizing tabs extending from one side of and into each of the openings therein, said sprags being formed with notches on opposite sides thereof which extend transversely with respect to said annular ring and which are formed substantially medially between said wedging surfaces, said energizing tabs being seated in the notches in one side of the sprags and the opposite sides of the openings in said annular ring being seated in the notches in the other side of the sprags and said energizing tabs being effective to continuously tilt the sprags toward wedging engagement with said races about said opposite sides of said openings as tilting axes, and transversely extending wrinkles formed in said tabs for providing a peripheral yield in the annular ring between each adjacent pair of sprags so that any one of the sprags may be displaced peripherally relative to the remainder of the sprags.

16. Cage structure adapted to tilt a plurality of wedging devices into wedging engagement with a pair of races comprising a flexible metal strip having a plurality of spaced openings therein adapted to receive the wedging devices, said openings being defined on two opposed sides by longitudinally extending portions of said strip and on two other opposed sides by cross portions of said strip, one of the sides defined by the cross portions being adapted to seat in a transversely extending notch in each wedging device when they are disposed in the openings to provide tilting axes for the wedging devices, the other side defined by the cross portions including means defining a tab extending into the respective opening and adapted to engage and bias the wedging device by spring action, due to resilience of the strip itself, into wedging engagement with the races, and said strip including means defining transverse wrinkles therein in said tabs corresponding to each of said openings for providing spaced yield points in said strip adapted to permit displacement of each of the wedging devices relative to the others without permanently distorting the strip when the wedging devices are disposed in the openings in the strip.

17. Cage structure as set forth in claim 16 wherein the transverse wrinkles are formed in the tabs and in the longitudinally extending portions of the strip.

18. Cage structure as set forth in claim 16 wherein the transverse wrinkles comprise aligned wrinkles formed in the tabs and in the longitudinally extending portions of the strip.

19. Cage structure adapted to peripherally space and tilt a plurality of wedging devices into wedging engagement with a pair of opposed concentric races comprising a strip of flexible material having a plurality of spaced openings therein adapted to receive the wedging devices, said openings being defined in part by edges adapted to engage the wedging devices and bias them by spring action, due to resilience of the strip itself, into wedging engagement with the races, said flexible strip including means defining transverse wrinkles corresponding to each of said openings for providing spaced yield points in said strip adapted to permit displacement of each of the wedging devices relative to the others without permanently distorting the strip when the wedging devices are disposed in the openings therein, and a substantially rigid member having a permanent cylindrical set adapted to be disposed concentrically around said flexible strip and having openings therein larger than the wedging devices for permitting a limited amount of peripheral movement of the wedging devices relative to the rigid member.

20. Cage structure adapted to tilt a plurality of wedging devices into wedging engagement with a pair of races comprising a flexible metal strip having a plurality of spaced openings therein adapted to receive the wedging devices, said openings being defined on two opposed sides by longitudinally extending portions of said strip and on two other opposed sides by cross portions of said strip, one of the sides defined by the cross portions being adapted to seat in a transversely extending notch in each wedging device when they are disposed in the openings to provide tilting axes for the wedging devices, the other side defined by the cross portions including means defining a tab extending into the respective opening and adapted to engage and bias the wedging device by spring action, due to resilience of the strip itself, into wedging engagement with the races, and said strip including means defining transverse wrinkles therein corresponding to each of the said openings for providing spaced yield points in said strip adapted to permit displacement of each of the wedging devices relative to the others without permanently distorting the strip when the wedging devices are disposed in the openings in the strip, said strip including additional openings between each of the first-mentioned openings, which additional openings are defined on opposed sides by longitudinally extending portions of said strip, said transverse wrinkles being formed in said last-mentioned longitudinally extending portions of said strip.

References Cited in the file of this patent

UNITED STATES PATENTS

| | | |
|---|---|---|
| 2,383,595 | Dodge | Aug. 28, 1945 |
| 2,399,749 | Lund | May 7, 1946 |
| 2,428,962 | Davis | Oct. 14, 1947 |
| 2,630,896 | Dodge | Mar. 10, 1953 |
| 2,750,019 | Ferris | June 12, 1956 |

FOREIGN PATENTS

| | | |
|---|---|---|
| 617,301 | France | Nov. 19, 1926 |